United States Patent [19]

Waddington et al.

[11] Patent Number: 4,717,000

[45] Date of Patent: Jan. 5, 1988

[54] INTEGRATED EMERGENCY LUBRICATION SYSTEM

[75] Inventors: Clive Waddington, Stratford; Normand L. Lagasse, Milford; George T. Milo, Stratford, all of Conn.

[73] Assignee: Avco Corporation, Providence, R.I.

[21] Appl. No.: 893,176

[22] Filed: Aug. 5, 1986

[51] Int. Cl.$^4$ .................. F01M 1/18; F01M 11/10; F01M 9/10; F16C 35/00

[52] U.S. Cl. .................. 184/61; 184/6.4; 184/6.11; 184/6.22; 184/6.26; 184/108; 60/39.08; 60/39.091; 384/473

[58] Field of Search .............. 184/6.4, 6.1, 6.11, 184/6.22, 6.26, 108; 60/39.091, 39.07, 39.08; 384/468, 473

[56] References Cited

U.S. PATENT DOCUMENTS

| | | | |
|---|---|---|---|
| 2,886,133 | 5/1959 | Mauck | 60/39.08 |
| 2,986,433 | 5/1961 | Herrmann | 60/39.08 |
| 3,779,345 | 12/1973 | Barnes | 60/39.08 |
| 4,284,174 | 8/1981 | Salvana | 60/39.08 |
| 4,309,870 | 1/1982 | Guest | 60/39.08 |
| 4,511,016 | 4/1985 | Doell | 184/6.11 |
| 4,574,584 | 3/1986 | Hovan | 60/39.07 |

FOREIGN PATENT DOCUMENTS

| | | | |
|---|---|---|---|
| 68620 | 6/1977 | Japan | 184/6.11 |
| 140063 | 10/1979 | Japan | 184/6.11 |
| 141025 | 9/1982 | Japan | 184/6.11 |

Primary Examiner—Leonard E. Smith
Assistant Examiner—Jane E. Obee
Attorney, Agent, or Firm—Perman & Green

[57] ABSTRACT

An integrated emergency lubrication system is provided to lubricate the bearings of a gas turbine engine in the event that the normal lubrication system for the engine fails for any reason. The emergency system includes an accumulator for storing oil, derived from the normal lubrication system, that is released in a controlled manner to lubricate the engine's bearings for several minutes after the normal lubrication system fails. During that time, the operator of the engine has an opportunity to cope with the situation. Energy for operating the emergency lubrication system is derived from compressed air bled form the compressor section of the engine, the compressed air also being combined with oil from the accumulator to form an air/oil mist that is sprayed over the bearings to be lubricated. A plurality of valves provided to control the flow of the oil and the air and to regulate the pressure of the air, all valves and associated elements being integrated in an assembly that is relatively inexpensive to manufacture, highly reliable, and easily maintained. The configuration also minimizes vulnerability to extraneous forces and has the further benefit of not being attitude sensitive, rendering it particularly useful in aircraft employing gas turbine engines.

16 Claims, 8 Drawing Figures

U.S. Patent  Jan. 5, 1988  Sheet 2 of 2  4,717,000
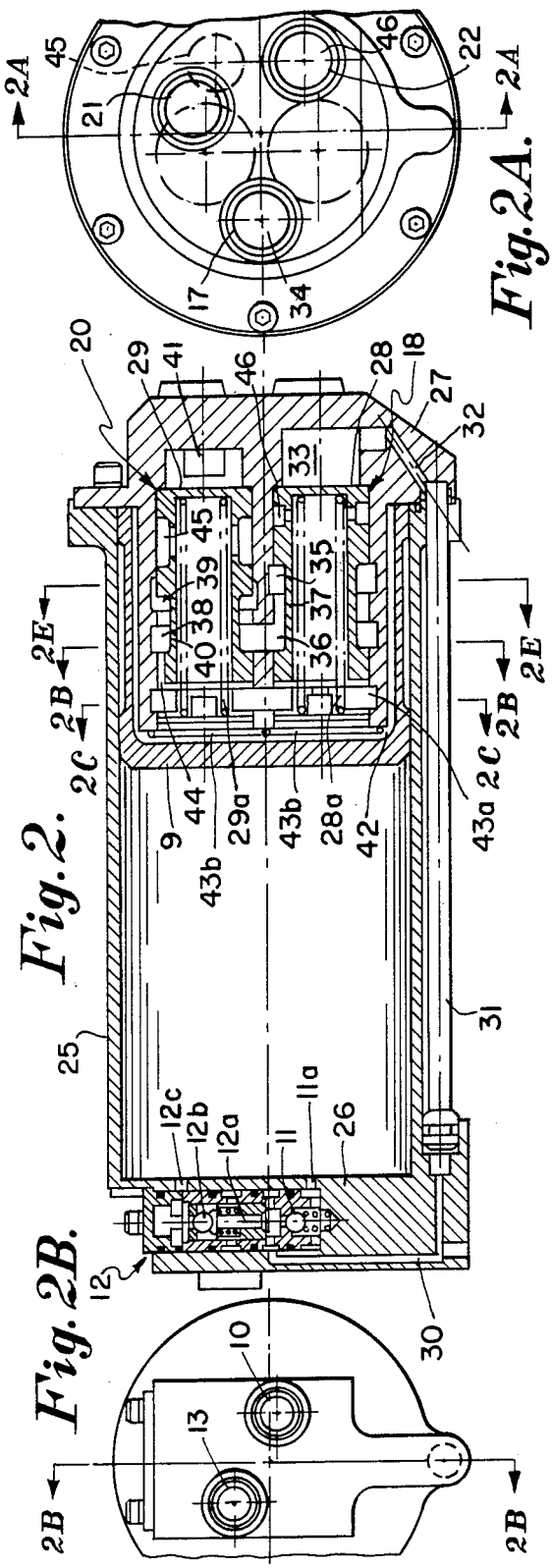
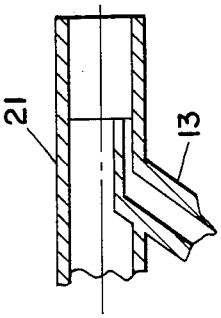
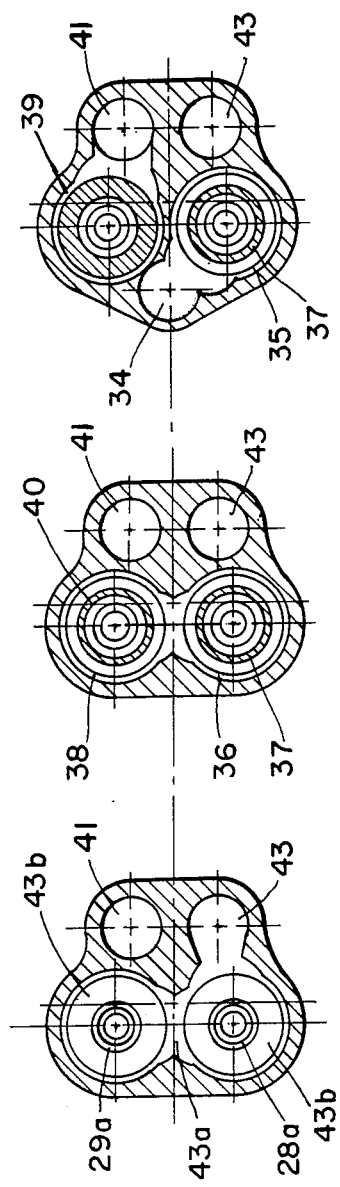

INTEGRATED EMERGENCY LUBRICATION SYSTEM

BACKGROUND OF THE INVENTION

Gas turbine engines include numerous bearings, many of them operating at high speed, that require continuous lubrication to preserve the integrity of the engine. Under normal operating conditions, the bearings receive lubrication from the engine's oil supply system. However, if that supply of oil is interrupted, whether due to faulty operation or damage from enemy action as in military aircraft, the bearings would fail almost immediately for lack of lubrication with disastrous consequences. To cope with such situations, it is imperative that an emergency backup system be provided so that the engine can continue to operate safely for a time sufficient to permit its operator to shut down the engine and take steps to protect his own safety.

The present invention comprises an integrated emergency lubrication system that provides continuous lubrication for the bearings of a gas turbine engine assuring safe operation at nearly full power for several minutes in the event the engine's main oil supply fails. The emergency system is highly reliable, easily maintained, and relative invulnerable to damage yet can be manufactured at relatively low cost.

SUMMARY OF INVENTION

The preferred embodiment of the present invention provides an integrated emergency lubrication system for a gas turbine engine comprising an emergency oil accumulator that is charged with oil by the engine's lubrication system. The accumulator includes a cylinder within which a piston is movably housed. Compressed air, bled from a high pressure stage of the gas turbine engine's compressor section, is conveyed to an oil pressure activated valve that is normally held in a closed position by the oil pressure of the engine's lubrication system. Should that system fail and the pressure of the oil fall as a result, the oil pressure activated valve opens and admits compressed air to an air pressure regulator from which pressure regulated air flows to the space behind the piston of the accumulator. Movement of the piston forces oil from the accumulator into a series of conduits connected to the bearings requiring lubrication. Pressure regulated air is also directed to the outlets of the conduits where it combines with the oil to form an air/oil mist that is sprayed over the bearings.

Since the compressed air leaves the compressor section of the engine at relatively high temperature, a heat exchanger is provided to cool the air by dumping its heat to the engine's fuel flowing through the heat exchanger. This heat exchanger is part of the normal system heat exchanger and is available to cool the air as the oil cooling load is removed in the emergency mode.

A check valve is provided to prevent a reverse flow of oil from the accumulator back to the engine's supply system in the event that it fails, thereby isolating the emergency system from the engine's oil system and permitting the emergency system to assume the function of lubricating the engine's bearings. In addition, an oil shut-off valve is provided to prevent oil from flowing from the accumulator to the bearings while the engine's oil supply system is operating properly. As a further precaution, a hydraulic fuse is interposed between the engine's oil supply system and the emergency system to block the connection between them in the event that the emergency system itself should develop leakage.

DESCRIPTION OF THE DRAWINGS

The invention is described in more detail below with particular reference to the attached drawings in which:

FIG. 2 is a longitudinal cross sectional view of an integrated assembly incorporating the accumulator and various of the check valves as well as the control and regulating valves of the system;

FIG. 2A and FIG. 2B are elevational views of the ends of the assembly shown in FIG. 2;

FIGS. 2C through 2E are cross sectional views of valve assemblies shown in FIG. 2, the views being taken on planes C—C, D—D, and E—E, respectively, as indicated in that view; and FIG. 3 is an enlarged cross sectional view of a jet in which oil and compressed air are combined to form an air/oil mist for lubricating the bearings of the gas turbine engine.

DESCRIPTION OF THE SCHEMATIC

Figure 1:
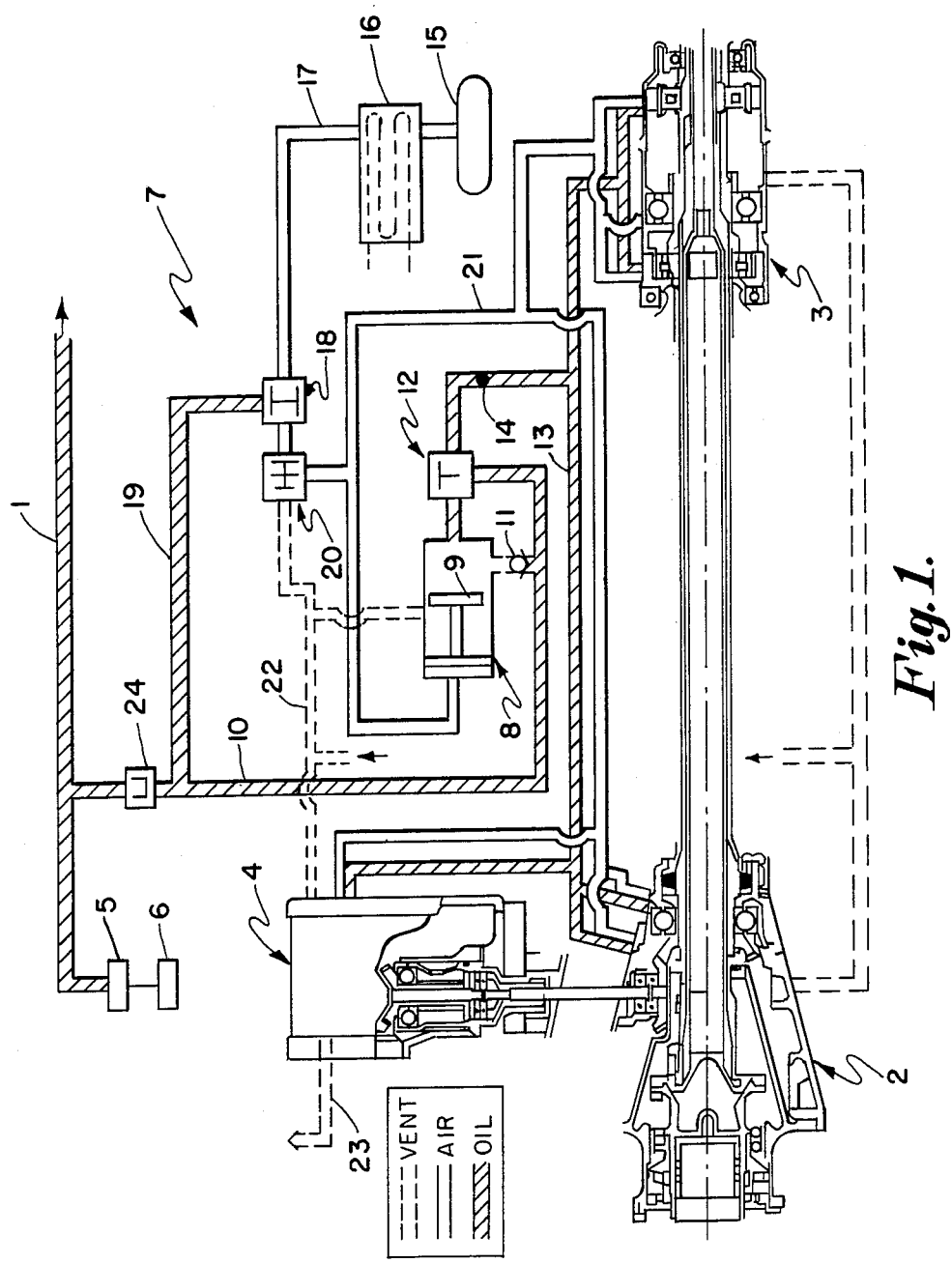
FIG. 1 is a schematic representation of the elements of the emergency lubrication system.

Indicated by reference numeral 1 of FIG. 1 is the normal lubricating oil supply line of a gas turbine engine (not shown) for supplying oil under pressure to the engine's bearing assemblies, generally designated 2 and 3, and to an accessory gearbox, generally designated 4. Supply line 1 is connected by conduits (not shown) to bearing assemblies 2 and 3 and to gearbox 4, for delivering lubricating oil thereto during normal operation. An oil pump 5, driven by the engine, pumps oil from a sump 6 to the oil supply line so that, during normal operation, the bearing assemblies 2 and 3, including others not shown, are properly lubricated. However, in the event that the supply line, pump or other elements of the normal lubricating system should be damaged or fail for any reason, the various bearings of the engine would immediately be starved for oil and catastrophic failure of the engine occur almost immediately with obvious dire consequences. The integrated emergency lubrication system, generally designated 7 in FIG. 1, is designed to cope with such a situation and to assure uninterrupted lubrication of the bearings and continued safe operation of the engine for six minutes or more at 75% of maximum rated power. During that time, the engine's operator can shut down the engine and take other appropriate emergency measures.

The emergency lubrication system includes an emergency oil accumulator, generally designated 8, housing a movable piston 9. When the engine is first started, oil flows from the supply line 1 through conduit 10, the pressure of the oil lifting check valve 11 off its seat and forcing oil into the accumulator where it is stored for use in lubricating the bearing in the event that an emergency should arise. As the oil enters the accumulator, piston 9 is forced to its extreme left hand position as shown in the schematic. As will be described shortly, the piston can be forced to the right to displace the oil from the accumulator and eventually to the bearings requiring lubrication during an emergency period.

Conduit 10 is also connected to an oil shut off and check valve, generally designated 12. That valve is normally held in a closed position by the pressure of the oil in supply line 1, thereby preventing oil from flowing out of the accumulator during normal operating conditions. However, if the pressure of the oil in the supply line falls, as during an emergency situation, valve 12 will open, permitting oil from the accumulator to flow through conduit 13 to the bearing assemblies and accessory gearbox. An orifice 14 may be provided in conduit 13 to control the rate of flow to a desired level.

The energy for moving piston 9 towards the right is derived from compressed air bled from a high pressure stage of the engine's compressor section symbolically indicated at 15. Since the air leaving the compressor may be at 200 psi and as hot as 800° F., it is cooled in a heat exchanger 16, through which flows cold engine fuel, before flowing through conduit 17 to an oil pressure activated valve, generally designated 18. That valve is normally held in a closed position by the pressure of the oil in supply line 1 which is in fluid communication with the valve via conduit 19. When the pressure in supply line 1 falls, as during failure of the engine's own lubrication system, valve 18 opens to admit compressed air from conduit 17 to a pressure regulating valve, generally designated 20, which reduces the pressure of the air to a desired level before it is admitted to conduit 21 connected to accumulator 8, bearing assemblies 2 and 3, and the accessory gearbox 4. The pressure of the air, acting on the left end of piston 9, forces it to the right, thereby displacing oil from the accumulator through orifice 14 and conduit 13 to the various bearing assemblies and gearbox. Compressed air from conduit 21 also combines with the oil from conduit 13 to form an air/oil mist that sprays over the various bearings and provides lubrication for them as long as the emergency oil supply in the accumulator lasts.

Vent line 22 interconnects bearing assemblies 2 and 3, as well as the accumulator 8, to the accessory gearbox for reasons that will be explained more fully below. The gearbox is vented to the atmosphere as indicated at 23.

As a further precaution, a hydraulic fuse 24 is provided between supply line 1 and conduits 10 and 19. Should the emergency lubricating system itself fail, as by developing an oil leak, the hydraulic fuse blocks flow of oil from the supply line to conduits 10 and 19, in effect isolating the entire emergency lubricating system from the engine's own lubricating system. This assures that no oil will be lost form the engine's own system.

In partial recapitulation, the various bearing assemblies of the gas turbine engine are lubricated by the engine's own oil supply under normal operating conditions. During such time, the accumulator is charged with an emergency oil supply by the engine's normal lubricating system, but shut off valve 12 prevents oil from flowing through the accumulator to the bearings. Check valve 11, while admitting oil to the accumulator, prevents a reverse flow back into the engines' oil supply system if it fails. In such event, compressed air from the compressor section of the engine is admitted by the oil pressure activated valve 18 to pressure regulating valve 20 and thence to the accumulator where the pressure of the air, acting on piston 9, forces the emergency oil out of the accumulator and past valve 12 to the bearings where lubrication must be maintained. Compressed air is also conducted to the bearings where it combines with the oil to form an air/oil mist that is sprayed over the bearings, as will be described with reference to FIG. 3.

Integrated Configuration

Attention is now directed to FIG. 2 showing the preferred embodiment of the invention in which the various elements, described with reference to FIG. 1, are combined in an integrated structure. To promote clarity, the elements are identified by common reference numerals.

The accumulator has a cylindrical housing 25, closed at its left end by wall 26 and at its right end by cap 27, as shown in FIG. 2. Piston 9 is closely fitted but movable within the housing, the interior of the cylindrical housing between end wall 26 and the left face of the piston defining a volume within which oil may be stored for emergency use in lubricating the engine's bearings. End cap 27 extends into the interior of the piston, the oil pressure activated valve 18 and pressure regulating valve 20 being built into the end cap 27.

The left hand wall 26 houses check valve 11 and the oil shut off valve 12, is valve being shown in cross section as cut by plane B—B of FIG. 2B. Oil from the engine's oil supply line flows through conduit 10 (see FIG. 2B) into channels formed within the cap so as to communicate with check valve 11 and the lower end of a spring loaded plunger 12a holding ball 12b against the seat of the oil shut off valve 12. When the pressure of the incoming oil is sufficient, check valve 11 is forced open and oil flows through port 11a to the interior of cylindrical housing 25, thereby forcing piston 9 to its extreme right hand position as shown in FIG. 2. The pressure of the oil, acting on the lower end of the plunger 12a, combines with the force of its associated spring in holding ball 12b against it seat. If the oil from the engine's supply line should fall, check valve 11 prevents reverse flow of oil from the cylindrical housing 25 back into the supply line.

Under conditions of normal engine operation, the cylindrical housing of the accumulator fills with oil but cannot discharge that oil because valve 12 is held closed. However, if the pressure of the engine's oil supply should fall, the force of the oil, acting on the bottom of plunger 12a, would be reduced, and the pressure of the oil within the cylindrical housing, admitted above ball 12b by port 12c, would force ball 12b off its seat. Oil from the cylindrical housing would then flow through port 12d to conduit 13.

Attention is now directed to the right hand end of the accumulator as seen in FIG. 2, the cross sectional view shown there being taken on plane A—A of FIG. 2A. It will be noted that the oil pressure activated valve 18 includes a hollow spool valve 28 that can slide within end cap 27. The pressure regulating valve 20 also includes a hollow spool valve 29 that can slide within the end cap. As shown in FIG. 2, both spool valves are in the positions assumed before the gas turbine engine is started, the spool valves being forced to the right by associated springs 28a and 29a. When the engine is started, oil flows under pressure from the engine's supply line to the interior of the cylindrical housing 25, as has been described, and through channel 30 to pipe 31 which conveys it via channnel 32 to space 33 adjacent the end of spool valve 28. The pressure of the oil overcomes the force of spring 28a and forces spool valve 28 towards the left, blocking the flow of compressed air from the engine's compressor section to the pressure regulating valve 20 as will now be explained.

The compressed air, after being cooled in heat exchanger 16 (see FIG. 1), flows through conduit 17 to a channel 34 in the interior of end cap 27, the channel being shown in cross section in FIG. 2E. That channel communicates with groove 35, also formed in the end cap 27 surrounding spool valve 28. Spool valve 28 has an intermediate section 37 of reduced diameter to permit flow of compressed air from groove 35 to groove 36 also formed in end cap 27. Groove 36 communicates with another groove 38 as shown in FIG. 2D. From the latter groove the air can flow to still another groove 39, both grooves surrounding an intermediate section 40 of reduced diameter formed in spool valve 29 of the pressure regulating valve 20. As shown in FIG. 2E, the air from groove 39 can flow to a communicating channel 41, shown in cross section in FIGS. 2C, 2D, and 2E. Channel 41 communicating with space 42 at the back of piston 9. A vent channel 43 is also provided in end cap 27 as shown in FIGS. 2C, 2D, and 2E. The vent channel is in communication with space 43a, defined by cover plates 43b welded to the left end of end cap 27 adjacent the left ends of spool valves 28 and 29 (see FIG. 2 and FIG. 2C), as well as being connected to vent line 22 (see FIG. 1 and FIG. 2A).

For reasons to be explained below, spool valve 20 has a bleed hole 44, extending from the end of the spool valve to intermediate section 40, as well as transverse ports 45. The spool valve 28 also has transverse ports 46, ports 45 and 46 communicating with the hollow interiors of the spool valves.

Operation

As noted earlier, before the gas turbine engine is started, valves 28 and 29 are in the positions shown in FIG. 2. When the engine is started, oil under engine supply line pressure, typically 100 psi, opens check valve 11 and fills cylindrical housing 25, thereby establishing an emergency oil supply. Under normal operating conditions, the oil is blocked from leaving the housing by oil shut off and check valve 12 but does flow through pipe 31 and its associated channels to the right end of spool valve 18. The pressure of the oil forces the spool valve to the left closing off groove 35 so that compressed air from the engine's compressor section cannot flow from conduit 17 to groove 36. Under those conditions of normal operation, space 43a at the left hand ends of spool valves 28 and 29 is vented to line 22, the pressure of the air in the vent line stabilizing at the pressure of the gearbox 4 to which it is connected. That pressure is slightly above atmospheric pressure due to gas leakage from the bearing assemblies 2 and 3. Space 42 behind piston 9 also stabilizes at the air pressure of vent line 22 due to leakage of air through bleed hole 44 from grooves 38 and 39 into space 43a.

If the oil supply system of the engine becomes inoperative, the pressure in supply line 1 immediately drops, thereby permitting oil shut off and check valve 12 to open and reducing the pressure acting on the end of spool valve 28. The reduced pressure permits the spool valve to move to the position shown in FIG. 2 under the influence of spring 28a. As the spool valve shifts position, it uncovers groove 35 permitting the flow of compressed air from groove 35 to groove 36 via intermediate section 37 and thence to grooves 38 and 39. Since groove 39 is in communication with channel 41, the compressed air can flow via that channel to space 42, thereby applying pressure to the right side of piston 9. The pressure causes the piston to move towards the left, thus displacing oil from the cylindrical housing through the oil shut off and check valve 12 to conduit 13.

The air pressure acting on the piston is also communicated to the right end of spool valve 29. However, the spool valve will not move until the pressure differential acting across it is sufficient to overcome the force of spring 29a. When that occurs, spool valve 29 gradually covers groove 39, partially restricting the air flow to channel 41 and regulating the pressure of the air acting on piston 9. In the preferred embodiment, spring 29a is proportioned so as to prevent movement of spool valve 29 until the pressure differential across it is at least 30 psi. Spring 28a is proportioned so that spool valve 28 cannot move to the right until the pressure differential across it drops to 20 psi or less.

Should any oil tend to leak past the end of spool valve 28, it flows through transverse ports 44 to the interior of the spool valve and eventually through the center of the valve to the air vent channel 43. Such oil leakage provides lubrication for spool valves 28 and 29.

Should the pressure of the air acting on the end of spool valve 29 rise too high, spring 29a is compressed sufficiently to permit spool valve 29 to move to a position blocking groove 39. If the pressure rises still higher, the spring is compressed further, eventually bringing transverse ports 45 into communication with groove 39. Compressed air is thereby vented from groove 39 to the interior of the spool valve and thence to vent channel 43.

Air/Oil Mist Jets

Attention is now directed to FIG. 3 showing conduit 21 which conveys compressed air to the bearings needing lubrication. The end of the conduit where it enters a bearing assembly, such as those shown at 2 and 3 in FIG. 1, is merged with the end of conduit 13 which conveys the emergency oil supply from the accumulator to the bearing assemblies. The air, passing at high velocity over the end of the emergency oil supply conduit, mixes with the oil and generates a mist of air and oil which is sprayed over the bearings. It has been found that a mixture of 10 standard cubic feet of air per minute, mixed with 10 cc of oil, provides adequate lubrication when the engine is operating at 75% of maximum rated power.

Conclusion

From the foregoing description of the preferred embodiment of the invention, it will be understood that it provides an integrated emergency lubrication system that will preserve the integrity of a gas turbine engine for a substantial time after the engine's oil supply system fails. The components of the system can be built as a compact integral assembly attached to accessory gearbox 4, protecting them from destructive forces far more effectively than would be possible if they were separate and located at various places about the engine. Further, the integral assembly can be produced at a cost below that of a plurality of separate components.

According to the above description, the following invention is claimed as novel and is desired to be secured by Letters Patent of the United States; we claim:

1. An integrated emergency lubricating system for lubricating the bearings of a gas turbine engine when its normal lubrication system fails comprising:
   an oil accumulator for storing an emergency oil supply derived from the normal lubrication system when the gas turbine engine is operating normally;
   a source of compressed air; and
   oil pressure sensitive valve means responsive to the normal pressure of oil in the normal lubrication system for blocking the flow of oil from said accumulator to said bearings during normal operation, and responsive to a drop in the normal oil pressure in the normal lubricating system for permitting air to flow from said source to said oil accumulator when the normal lubrication system fails whereby oil in said oil accumulator is displaced by the air and supplied to the bearings requiring emergency lubrication.

2. An integrated emergency lubricating system as described in claim 1 in which said valve means also permits air to flow to the bearings requiring emergency lubrication where the air combines with the oil displaced from said oil accumulator to form an air/oil mist for lubrication purposes.

3. An integrated emergency lubrication system for lubricating the bearings of a gas turbine engine when its normal lubrication system fails comprising:

accumulator means for storing emergency oil derived from the normal lubrication system of the gas turbine engine;

a source of compressed air;

an air pressure regulator in fluid communication with said accumulator means; and valve means connected to said source of compressed air and to said air pressure regulator, said valve means being activated by the pressure of oil in the normal lubricating system to block flow of compressed air from said source to said air pressure regulator and prevent the flow of emergency oil from said accumulator means to said bearings, said valve means permitting flow of compressed air from said source to said air pressure regulator when the pressure of oil in the normal lubrication system falls whereby air from said air pressure regulator enters said accumulator means and displaces oil from it to cause the flow of emergency oil to said bearings for emergency lubrication purposes.

4. An integrated emergency lubrication system as described in claim 3 further comprising:

a check valve connected to said accumulator means and the normal lubrication system for admitting oil from the normal lubrication system to said accumulator means when the gas turbine is operating normally and for blocking oil from flowing back into the normal lubrication system when it fails; and an oil cut off and check valve for preventing oil from being displaced from said accumulator when the gas turbine engine is operating normally.

5. An integrated emergency lubrication system as described in claim 4 further comprising:

a first conduit for conveying air from said air pressure regulator to bearings of the gas turbine engine requiring lubrication during an emergency; and a second conduit for conveying oil displaced from said accumulator means to said first conduit adjacent the bearings to be lubricated whereby the air and oil combine to form a mist for lubricating the bearings.

6. An integrated emergency lubrication system for lubricating the bearings of a gas turbine engine when its normal lubrication system fails comprising:

an emergency oil accumulator including a cylindrical housing within which is housed a movable piston;

means for conveying oil from the normal lubrication system to said cylindrical housing when the normal lubrication system is operative;

means for preventing oil from being displaced from said cylindrical housing when the normal lubrication system is operative and for permitting oil to be displaced from said cylindrical housing when the normal lubrication system fails;

a source of compressed air;

an air pressure regulator;

valve means activated by oil under pressure supplied by the normal lubrication system, said valve means being connected to said source of compressed air for preventing flow of compressed air to said air pressure regulator when the normal lubricating system is operative and for permitting flow of compressed air to said air pressure regulator when the normal lubricating system fails; and means for conveying air from said air pressure regulator to said piston whereby the piston is moved to displace oil from said cylindrical housing.

7. An integrated emergency lubricating system as described in claim 6 further comprising:

a first end cap sealing one end of said cylindrical housing, said air pressure regulator, said valve means and, said valve means being located within said end cap.

8. An integrated emergency lubricating system as described in claim 7 further comprising:

a second end cap for sealing the other end of said cylindrical housing, said air pressure regulator and said valve named means being located within said second end cap.

9. An integrated emergency lubricating system as described in claim 8 in which said source of compressed air is the compressor section of the gas turbine engine.

10. An integrated emergency lubricating system as described in claim 9 further comprising:

a heat exchanger for cooling air from the compressor section of the gas turbine engine before it enters said valve means.

11. An integrated emergency lubricating system as described in claim 10 in which said valve means and said air pressure regulator comprise spool valves movably disposed within said first end cap.

12. An integrated emergency lubrication system for lubricating the bearings of a gas turbine engine when its normal lubrication system fails comprising:

an emergency oil accumulator including a cylindrical housing within which is housed a movable piston;

a first means for conveying oil from the normal lubrication system to said cylindrical housing of said emergency oil accumulator;

a check valve in said means for preventing oil from flowing from said cylindrical housing back to the normal lubrication system when it fails;

a second means for conveying oil from said cylindrical housing to the bearings to be lubricated;

a second check valve in said second means to prevent oil from flowing from said cylindrical housing to said second means when the normal lubrication system is operative;

a source of compressed air;

an oil pressure activated valve connected to the normal lubrication system, said oil pressure activated valve being connected to said source of compressed air and to an air pressure regulator, said oil pressure activated valve admitting compressed air from said source to said air pressure regulator when the pressure of the oil supplied by the normal lubrication system falls due to failure of that system; and means for conveying pressure regulated air from said air pressure regulator to the back of said piston whereby oil is forced from said cylindrical housing past said second check valve to said second means for conveying oil and thence to the bearings requiring lubrication.

13. An integrated emergency lubrication system as described in claim 12 further comprising:
means for conveying pressure regulated air from said air pressure regulator to said second named means where the air and the oil conveyed by said second named means combine to form an air/oil mist for lubricating the bearings.

14. An integrated emergency lubrication system as described in claim 13 in which said source of compressed air is the compressor section of the gas turbine engine.

15. An integrated emergency lubrication system as described in claim 14 further comprising:
a heat exchanger through which the compressed air from the compressor section of the gas turbine engine passes and by which it is cooled before flowing to said oil pressure activated valve.

16. An integrated emergency lubrication system as described in claim 15 further comprising:
a hydraulic fuse in said first means for conveying oil for isolating the normal lubrication system from the emergency lubrication system in the event that the emergency lubrication system fails.

* * * * *